United States Patent
Eick et al.

(10) Patent No.: US 9,921,322 B2
(45) Date of Patent: Mar. 20, 2018

(54) SEGMENTED BASE PLATE SEISMIC SWEEPS

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 84 days.

(21) Appl. No.: 14/964,823

(22) Filed: Dec. 10, 2015

(65) Prior Publication Data

US 2016/0170048 A1    Jun. 16, 2016

Related U.S. Application Data

(60) Provisional application No. 62/090,972, filed on Dec. 12, 2014.

(51) Int. Cl.
*G01V 1/00* (2006.01)

(52) U.S. Cl.
CPC .................................. *G01V 1/005* (2013.01)

(58) Field of Classification Search
CPC ..................................................... G01V 1/005
USPC ............................................... 367/36, 37, 75
See application file for complete search history.

(56) References Cited

U.S. PATENT DOCUMENTS

| | | |
|---|---|---|
| 3,159,232 A | 12/1964 | Fair |
| 4,481,612 A | 11/1984 | Curran |
| 4,497,044 A | 12/1985 | Silverman |
| 7,639,567 B2 | 12/2009 | Sitton |
| 2011/0297476 A1 | 12/2011 | Harper |
| 2012/0037445 A1 | 2/2012 | Eick |
| 2013/0286779 A1 | 10/2013 | Eick |
| 2013/0286780 A1 | 10/2013 | Eick |
| 2013/0286788 A1 | 10/2013 | Eick |
| 2013/0286789 A1 | 10/2013 | Eick |
| 2013/0286790 A1 | 10/2013 | Eick |
| 2013/0286791 A1 | 10/2013 | Eick et al. |

FOREIGN PATENT DOCUMENTS

WO    2013122659    8/2013

OTHER PUBLICATIONS

International Search Report for counterpart case, App. No. PCT/US15/064914, dated Feb. 12, 2016.

*Primary Examiner* — Daniel L Murphy
(74) *Attorney, Agent, or Firm* — ConocoPhillips Company (57) ABSTRACT

Vibrators for producing seismic signals for use in oil and gas exploration are equipped with segmented base plates, each segment being independently controlled and activated. The use of an array of base plate segments allows the individual segments of the array to be activated in a particular pattern, thus generating S-waves and other unconventional wave patterns for seismic use.

16 Claims, 5 Drawing Sheets

SEGMENTED BASE PLATE SEISMIC SWEEPS

PRIORITY CLAIM

This application is a non-provisional application which claims benefit under 35 USC § 119(e) to U.S. Provisional Application Ser. No. 62/090,972 filed Dec. 12, 2014, entitled "SEGMENTED BASE PLATE SEISMIC SWEEPS," which is incorporated herein in its entirety.

FIELD OF THE DISCLOSURE

The disclosure generally relates to seismic surveying and, particularly, to seismic sources with that use a segmented base plate in order to perform unconventional sweeps.

BACKGROUND OF THE DISCLOSURE

Geophysics is the study of the physics of the Earth, especially its electrical, gravitational, and magnetic fields, and the propagation of the elastic (i.e. seismic) waves within it. A major part of the search for oil and gas requires information concerning the geological features where hydrocarbons may be trapped.

Seismic surveying allows for mapping of subsurface distribution of different types of rocks and the fluids they contain. Oil field seismology, which accounts for approximately 95 percent of all geophysical activities worldwide, has traditionally been applied from the surface of the earth. The source and receivers of a surface seismic survey are usually positioned on the surface (or close to it), because surface equipment is the easiest to deploy.

Originally, land based seismic surveys were conducted using explosives as an energy source. These had advantages because the explosives were lightweight, could reach remote locations and provided a strong penetrating signal having a compact wavelet with wide bandwidth. However, explosives are dangerous, cannot be used in populated areas, and the survey geometry is not easily update since shot holes have to be drilled for every placement. Thus, explosives are no longer as popular as they once were.

Figure 1:
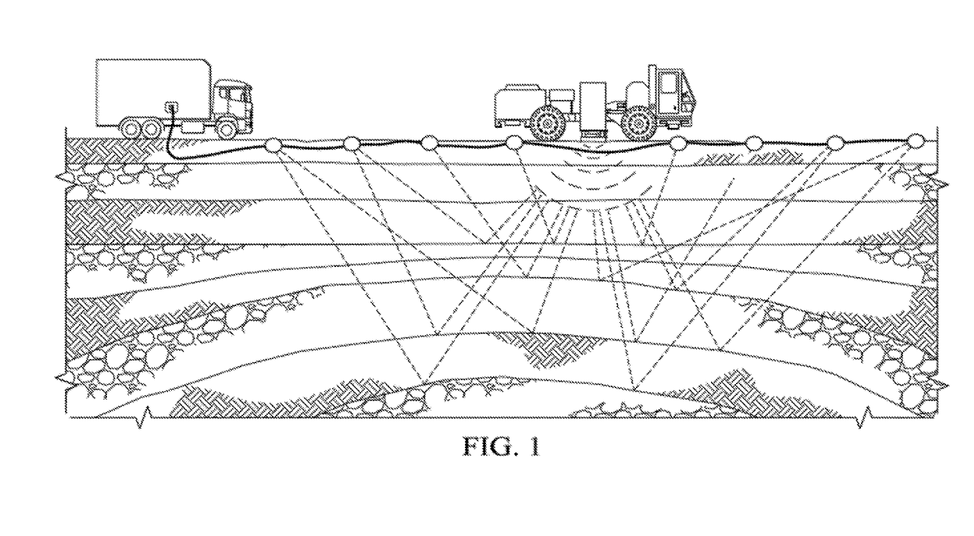
FIG. 1. shows a simplified schematic of a vibrator, geophones and recording truck set up to collect land based seismic data.

Vibroseis™ energy sources are the most common seismic source options for onshore hydrocarbon exploration. The generic term "vibrator" refers to these types of seismic sources, which were initially developed by Conoco in 1952 (see e.g., U.S. Pat. No. 2,688,124). The vibrator started life as an alternative to explosive sources on land. It had to compete for a short time with weight-drop trucks, but they could not be synchronized, whereas vibrators could (see e.g., FIG. 1). After various technologies were tested, hydraulic technology was found to be the most suitable for use in geophysics. In 50 years, the land vibrator weight, which is related to signal amplitude, increased from 10,000 to 90,000 lbs.

Vibrators have several features that make them attractive for seismic data acquisition. They are mobile and allow efficient and expeditious illumination of subsurface targets from many different shotpoint locations. Also, the frequency content of a vibrator signal often can be adjusted to better meet resolution requirements needed for a particular target. In addition, the magnitude of the energy input into the Earth can be tailored for optimal signal-to-noise conditions by varying the size and number of vibrators or by altering the output drive of individual vibrators. For these reasons, vibrators are one of the most versatile onshore seismic energy sources.

Vibrators work on the principle of introducing a user-specified band of frequencies, known as the "sweep," into the Earth and then cross-correlating that sweep function with the recorded data to define reflection events. The parameters of a vibrator sweep are:
  Start frequency
  Stop frequency
  Sweep rate
  Sweep length A vibrator can do an upsweep that starts with a frequency as low as 1 to 2 Hz and stops at a high value of 100, 150, or 200 Hz. Alternatively, vibrators can do a downsweep that starts with a high frequency and finishes with a low frequency. Most Vibroseis data are generated with upsweeps, however, due to ghosting issues and operational issues in the hydraulics controller.

Sweep rate can be linear or nonlinear. A linear rate causes the vibrator to dwell for the same length of time at each frequency component. Nonlinear sweeps are used to emphasize higher frequencies because the vibrator dwells longer at higher frequencies than it does at lower frequencies.

Sweep length defines the amount of time required for the vibrator to transverse the frequency range between the start and stop frequencies. As sweep length is increased, more energy is put into the Earth because the vibrator dwells longer at each frequency component. Sweep length is usually in the range of 4 to 60 seconds.

If a vibrator sweep is 12 seconds long, then each reflection event also spans 12 seconds in the raw, uncorrelated data, plus some listen time to allow the signal to propagate into the earth, reflect and return. It is not possible to interpret uncorrelated Vibroseis data because all reflection events overlay each other and individual reflections cannot be recognized.

The data are thus traditionally reduced to an interpretable form by a cross-correlation of the known input sweep with the raw data recorded at the receiver stations. Each time the correlation process finds a replication of the input sweep, it produces a compact symmetrical correlation wavelet centered on the long reflection event. In this correlated form, vibroseis data exhibit a high signal-to-noise ratio, and reflection events are robust wavelets spanning only a few tens of milliseconds. More modern techniques for designaturing the data involve inversion, deblending and wavefield reconstruction methods.

As a general observation, if an area is plagued by random noise, vibrators are an excellent energy source because the correlation process used to reduce the vibrator sweep to an interpretable form discriminates against noise frequencies that are outside the source sweep range. If several sweeps are summed, unorganized noise within the sweep range is attenuated (the noise cancels itself out), while the true signals are amplified. However, if coherent noise with frequencies within the vibrator sweep frequency range is present, then the correlation process may accentuate these noise modes.

Probably the most important improvement in vibrator operations has been the development of ground-force phase-locking technology. Application of this technology results in the same ground-force function (i.e., the same basic seismic wavelet) being generated during hundreds of successive sweeps by vibrators positioned over a wide range of ground-surface and soil conditions and by all vibrators in a multi-vibrator array. All aspects of seismic data processing benefit when a source generates consistent output wavelets throughout a seismic survey, hence the appeal of vibrators as the source of choice for most onshore surveys today.

Figure 2A:
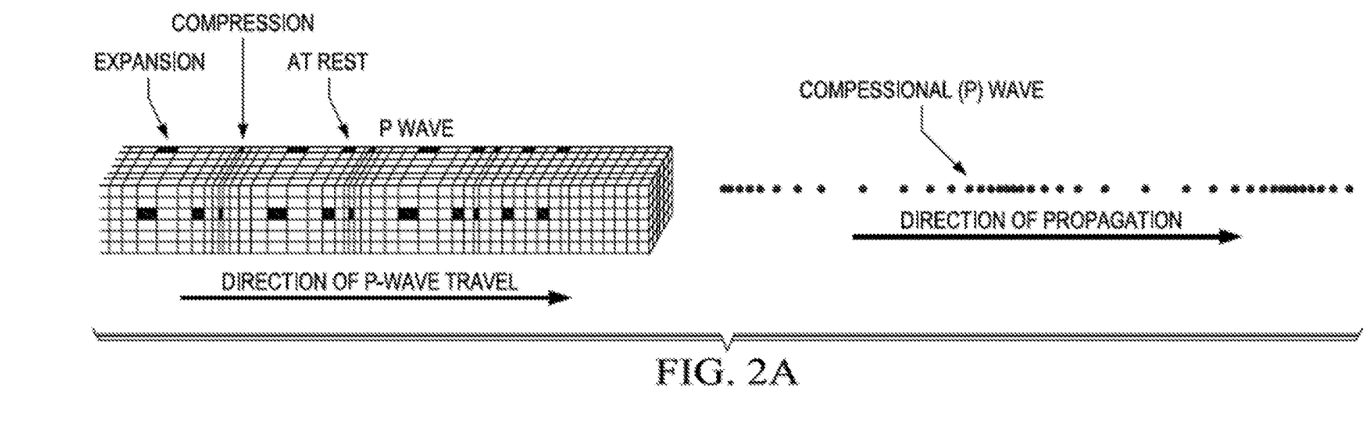
FIG. 2A shows P-waves and FIG. 2B shows S-waves.
Figure 2B:
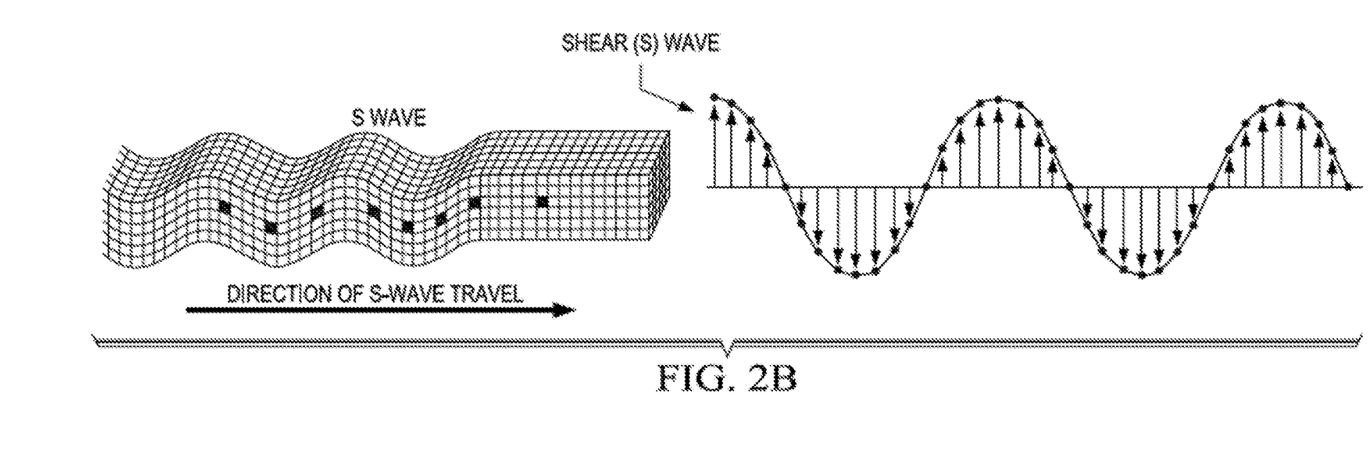

All seismic energy sources generate both surface waves and body waves. However, in seismic surveys, geophysicists are mainly interested in the body wave, since the desire is to visualize the interior structure of the reservoir. The two types of body waves are compressional (P) and shear (S) body waves (see FIGS. 2A and 2B respectively). P-waves are also called pressure or primary waves, and S-waves are also called secondary or transverse waves.

Shear waves have slower rates of propagation through the earth than do longitudinal waves, so they can produce a higher degree of resolution at a given frequency. This may enable the detection of subterranean anomalies that might otherwise be undetectable and the mapping of larger bodies with a higher degree of precision. Horizontally polarized shear waves are also less likely to be converted into different wave types upon interacting with horizontal interfaces, as is the case with compression waves, and accordingly seismograms made from such waves may be simpler to interpret.

Despite the recognized advantages of S-waves, the use of shear waves in seismic prospecting has been greatly limited because of the unavailability of suitable shear wave vibrator energy sources. This is due to the normally difficult problem of properly coupling the vibrator to the earth in shear mode. Without large teeth mounted to the shear vibrator base plate, the shear vibe tends to slide or "walk" off the source point and thus not input the correct signal into the ground. With large teeth, the vibe no longer walks, but may create unsightly holes or damage in the soil and cause difficulty with the surface landowner.

To study the physics and exploration applications of S-waves, it is often necessary to increase the amount of S-wave energy in the downgoing wavefield and to produce a shear wavefield that has a known vector polarization.

These objectives can be accomplished with sources that apply horizontally directed impulses to the Earth or by vibrators that oscillate their baseplates horizontally rather than vertically. In either case, a heavy metal pad is used to impart horizontal movement to the Earth by means of cleats on the bottom side of the pad that project into the Earth. A specific design for a horizontal shear-wave vibrator can be found in a patent issued to Fair (U.S. Pat. No. 3,159,232 Shear Wave Transducer).

Horizontal vibrators have also been improved with the introduction of ground-force phase-locking technology that results in more consistent shear wavelets from sweep to sweep as horizontal vibrators move across a prospect. Surface damage has been minimized by reducing the size of the cleats underneath the baseplate so that they make only shallow ground depressions.

Another method of generating shear waves is discussed in WO201312265, wherein tilted boreholes (15-45) are used together with directional detonations in an attempt to generate shear waves. If the borehole bottoms are near enough, the signals acquired in response to each firing can be combined (e.g., subtracted) to cancel the (non-directional) compressional wave information and reinforce the (directional) shear wave information. However, as noted above explosive use is sometimes not allowed. Further, the need for cased inclined boreholes limits the application of such technology.

Therefore, although several researchers have made efforts to design sources capable of providing shear waves, the results to date can still be improved. Shear wave energy sources have proven to be either infeasible or lacking in sufficient reproducibility, frequency band width, and power for repeated high resolution surveys for, e.g., reservoir monitoring. Thus, what is needed in the art are better methods of generating shear waves and preferably methods will also allow control over the direction and amplitude of shear waves, be highly reproducible from shot to shot, and of sufficient strength for deep penetration.

SUMMARY OF THE DISCLOSURE

The present disclosure describes a novel methodology for seismic surveys.

ConocoPhillips has developed yet another improvement in vibrator technology, wherein the base plate of the vibrator is segmented, such that each segment can be independently controlled. The advent of this new segmented baseplate vibrator has allowed herein the development of new seismic wave generation methodologies, heretofore not possible. In particular, the new segmented baseplate may be used to provide a source of shear waves, making these waves easier to propagate than the prior art devices and methodologies.

US20130286791, for example, describes an electric sweep type seismic vibrator source that uses an engine and generator combination to create electric power and drive a framework of linear electric motors that direct a framework of rods or pistons to contact the ground. Each motor is independently controlled and operated, allowing the operator to individually control the rods, and thus specify the pattern of activation.

For example, proceeding from one side to the other (sequential activation) of the baseplate components allows the imparting of an S-wave, in the same direction in which the components were activated. Including additional vibrators, directing the S-waves towards one another will allow the focusing of the shear waves at a focal point, and other unconventional wave patterns are also made possible.

As used herein a "vibrator" is an onshore seismic energy source, typically a large vehicle weighing 60,000 lbs or more. A vibrator transmits seismic energy into the Earth through a heavy baseplate that is pressed to the ground, and then vibrated over a prescribed frequency range.

As used herein a "segmented vibrator" is new vibrator type, wherein the baseplate of the vibrator is segmented, and each segment has separate control elements, such that the operator can independently control each of the segments of the base plate. An exemplary device is described in US20130286791, but any segmented baseplate technology with individual control of the segments could be used.

As used herein, a "geophone" is an instrument that detects vibrations passing through the earth's crust, regardless of whether it responds to the velocity or the accelerations of the vibration.

As used herein, a "S-wave" or shear wave refers to a wave wherein particle movement is perpendicular to the direction of wave propagation.

As used herein, "sequential activation" refers to activating the segments of a segmented base plate in a linear fashion, proceeding from one side to the other or from the center to the outside. The direction of sequential activation controls the direction of the shear wave propagation.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DETAILED DESCRIPTION

The disclosure provides a novel methodology of creating S-waves, as well as other unconventional wave types. As described herein, the segments of a segmented vibrator can be operated differentially, sweeping from one side of the frame to another, thus delivering a ripple effect and generating S-waves.

Generally speaking, the methodology uses a vibrator with a novel segmented base plate, wherein each segment of the base plate can be independently activated. The device is programmed to activate in a side-to-side, wave-like manner, thus imparting an S-wave to the terrain. The direction of the S-wave can be controlled by controlling the direction of the side-to-side sequential activation of base plate components.

For example, if the segmented base plate components are arrayed in an 8 row×12 column rectangular array, then all the 8 components in column 1 are activated first. After an appropriate delay, the 8 components in column 2 are activated. This is followed by the 8 components of column 3, etc.

Alternatively, if it is desired to propagate a S-wave in a direction 90° to the first example, then the 12 components of the first row are activated, then after an appropriate delay the 12 components of the second row, then the 12 components of the third row, etc. One can thus propagate a wave in any of the four directions using this technique.

While the activation can coincide with one side of a square or rectangular array of base plate components, it need not necessarily do so, and diagonal lines of activation are also contemplated. Alternatively, the center component can be activated followed by a radial activation of the remaining components outward to the edge.

It is important to realize that the controller would have to vary the speed and delay of the actuation of each segment during the sweep at different rates and speeds to create the waveforms desired. Because the actuation motors are linear electric motors or similar they are highly responsive and can be controlled precisely during the sweep with simple electronic controls. Thus, these complex waveforms and S-waves are now made possible.

Various patterns of activation of the individual segments of an single vibrator truck array can produce complex wave patterns. For example, box waves, shear waves, plane waves or even focused waves down to a point source, are made possible herein. Further variability can be obtained by using a plurality of vibrator trucks, either synced or staggered to allow, e.g., constructive addition of waves to form a larger wave.

One example of an alternative wave form would be taking the outside two rows of the segmented baseplate and actuating each one while deactivating the other side at the same time. This would create a rocking shear wave.

Another interesting application is the use of several vibrators trucks in a group where each segmented baseplate creates part of a much larger overall wavelet. For example, if four vibrator trucks were arranged in a box array, the vibe in the northeast (NE) corner could start a shear wave sweep heading toward the southwest (SW) and with proper timing, the northwest (NW) and SE could constructively add to it and then the final vibe in the SW add to the power of the sweep and send it out to the receivers for detection and recording.

There are all sorts of possible combinations of multi-vibe fleet type wavelets that could be made by orienting the vibes in different patterns and using the constructive and destructive interference between the vibes.

The invention includes one or more of the following embodiments, in any combination(s) thereof:

A method of providing various P and S-wave source sweeps for seismic data acquisition. These various sweeps are made by sequentially actuating individual elements of a novel segmented baseplate to start and create the waves in different types, directions and orientations.

A method of generating unconventional waves for a seismic survey, said method comprising: providing a vibrator having a segmented baseplate, said segmented baseplate having an array of independently controllable base plate segments; and activating said base plates segments in a pattern across said array, so as to generate unconventional waves reflecting said pattern. Activating all segments simultaneously is not considered a "pattern" herein, which requires differential activation of the segments.

A method of generating waves for a seismic survey, said method comprising: providing a vibrator having a segmented baseplate, said segmented baseplate having an array of independently controllable base plate segments; and activating said base plates segments in a pattern across said array, so as to generate waves reflecting said pattern.

A method of generating a shear wave (S-wave) for a seismic survey, said method comprising: providing a vibrator having a segmented baseplate, said segmented baseplate having an array of independently controllable base plate segments; and activating said base plates segments sequentially in a direction across said array, so as to generate an S-wave propagating in said direction.

A method of focusing shear waves (S-wave) at a focal point for a seismic survey, said method comprising: providing a first vibrator having a segmented baseplate, said segmented baseplate having an array of independently controllable base plate segments; providing a second vibrator having a segmented baseplate, said segmented baseplate having an array of independently controllable base plate segments; and activating said base plates segments of said first vibrator sequentially in a first direction across said array, so as to generate a first S-wave propagating in said first direction; activating said base plate segments of said second vibrator sequentially in a second direction across said array, so as to generate a second S-wave propagating in said second direction; such that said first S-wave and said second S-wave cross at a chosen focal point.

A method of generating compression (P-waves) wave for a seismic survey, said method comprising: providing a vibrator having a segmented baseplate, said segmented baseplate having an array of independently controllable base plate segments; and activating said base plates segments sequentially in a direction across said array, so as to generate a P-wave propagating in said direction.

A method of seismic survey of a geologic region, said method comprising:

providing a vibrator in a geologic region of interest, said vibrator having a segmented baseplate, said segmented baseplate having an array of independently controllable base plate segments; activating said base plates segments sequentially in a pattern across said array, so as to generate unconventional waves reflecting said pattern; detecting reflected or refracted waves in a series of geophones positioned on a surface of said geologic region; and processing said recording data and interpreting said processed data to prove a seismic survey of said geologic region.

A method as herein described wherein there are a plurality of vibrators generating a plurality of S-waves in a plurality of directions, and wherein said plurality of S-waves intersect at a chosen focal point.

A method as herein described wherein there are a plurality of vibrators generating a plurality of S-waves in a plurality of directions, and wherein said plurality of S-waves are appropriately delayed so as to constructively form a larger source wave and not intersect at a chosen focal point.

A method as herein described employing a plurality of vibrators having segmented base plates, such that a plurality of S-waves cross at a chosen focal point.

A method as herein described wherein there are a plurality of vibrators generating a plurality of P-waves in a plurality of directions, and wherein said plurality of P-waves intersect at a chosen focal point.

A method as herein described wherein there are a plurality of vibrators generating a plurality of P-waves in a plurality of directions, and wherein said plurality of P-waves are appropriately delayed so as to constructively add to form a larger source wave.

A method as herein described wherein said pattern is a sequential pattern travelling in a direction across said segmented base plate to generate an S-wave in said direction.

A method as herein described wherein said pattern is a sequential pattern travelling in a direction across said segmented base plate to generate a P-wave in said direction.

A method as herein described wherein after a segmented base plate is activated, it switches to a regenerative braking mode and uses the relaxation phase of the activated base plate to recover energy and store it for later use.

Figure 3:
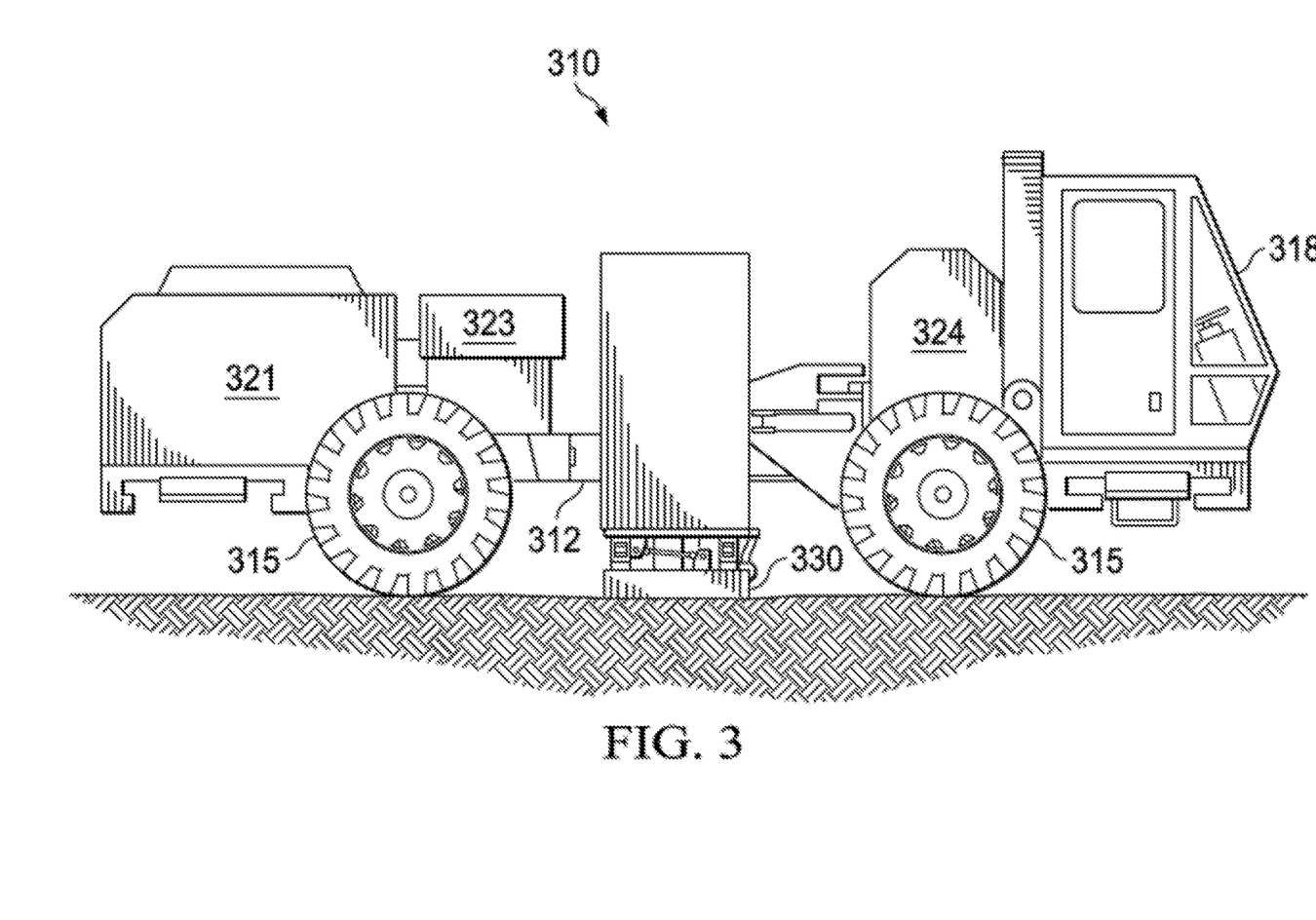
FIG. 3 is an elevation view of an electric seismic source unit, typically called a "vibrator" in the art.

As shown in FIG. 3, a vibrator seismic source 310 is shown comprising a chassis 312, four wheels 315 and a driver's cab 318. The alternative vibrator actuator source 310 uses a diesel engine 321 to turn an electric generator 323 and uses electric power to power the source 310 both for delivering acoustic energy into the ground and for moving along the ground from location to location. The source 310 utilizes electricity for all of its power needs. A large electric power accumulator 324 such as a battery or capacitor is included to store energy for high electric demand situations or when there are problems with the generator 323, but the accumulator 324 provides the power to return to a location for repair.

By including a large electric power accumulator 324, the diesel engine 321 and electric generator 323 may be sized and engineered to deliver some electric power output lower than peak demand utilizing the accumulator to meet the highest needs. As such, the seismic source 310 may be smaller and obtained at lower cost and may have a lower operating cost to provide equivalent acoustic energy output.

Figure 4A:
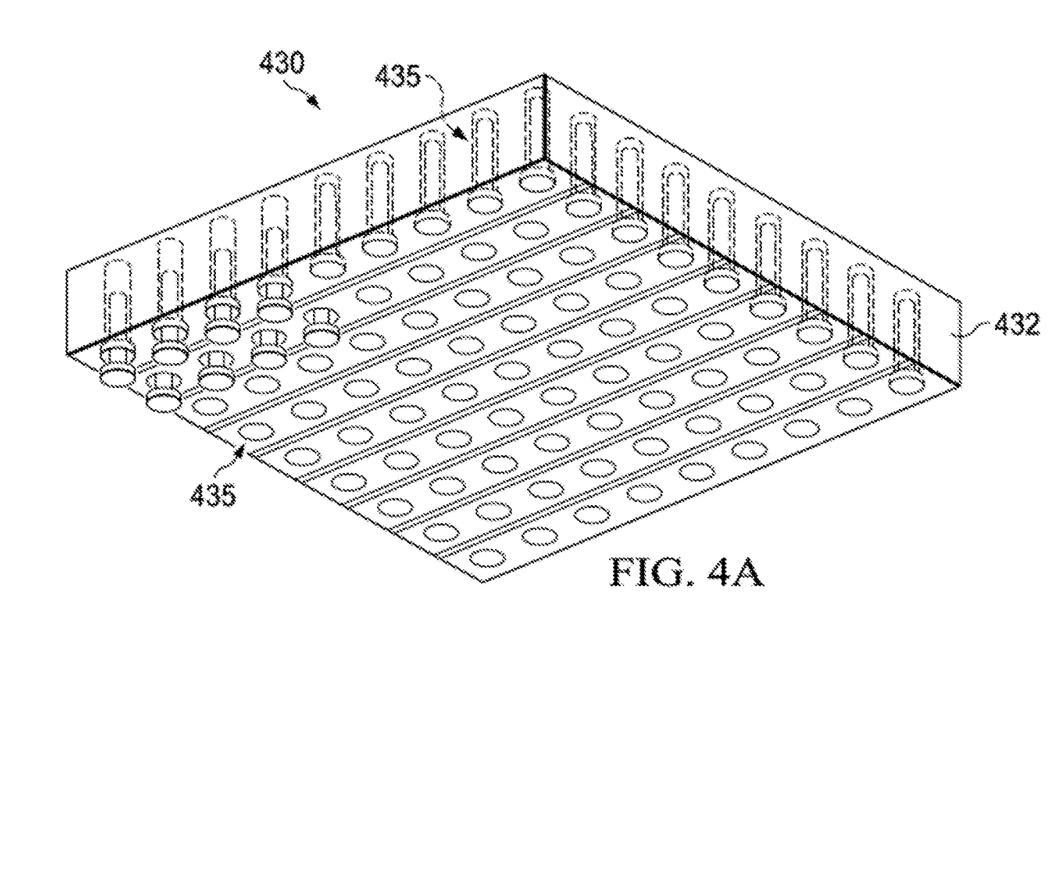
FIG. 4A is an enlarged perspective fragmentary view of a grid of electro-mechanical linear motor assemblies for cooperatively delivering seismic energy into the ground.
Figure 4B:
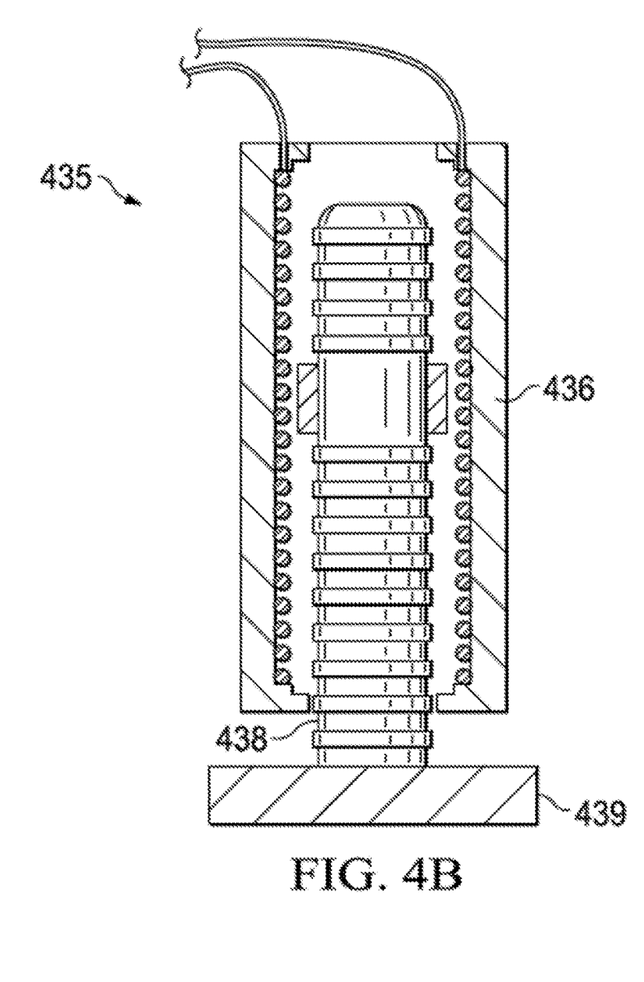
FIG. 4B is an enlarged fragmentary view of a single electromechanical linear motor assembly for delivering seismic energy into the ground. Segmented vibrator illustrations adapted from US20130286791.

Referring now to FIGS. 4A and 4B, the acoustic energy delivery system 430 is carried under the chassis 412 and comprises a frame 432 that carries a number of linear motors 435. Linear motors are commercially available equipment and each manufacturer has variations on the design, but in principal, each linear motor 435 includes a tubular body 436 and a rod or actuation bar 438 positioned within the tubular body 436 that extends telescopically from the lower end of the tubular body 436. A replaceable foot 439 is attached to the bottom end of the rod 438 for contacting the ground. The frame 432 includes mounts for a grid of linear motors 435, in this case arranged in a 9×9 array.

In one envisioned embodiment, the frame 432 has approximately 112 linear motors 435 arranged in a grid of e.g., 8 by 14. Each linear motor is capable of e.g., outputting a peak acceleration force of approximately 2400 Newtons (N) or approximately 540 pounds-force while using 34 amp RMS (Arms) at 240 volts AC, but other forces are possible. The 112 linear motors would then be capable of outputting 268,800 N or 60,480 pounds-force using approximately 914 kilowatts of power if used in concert.

The above base plate segments can be activated in a wave, e.g., every row of 8 being sequentially activated to generate a segment wave across the 14 columns of the array. Alternatively, each individual base plate segment can be actuated independently of others in the row or column to create varied waveforms.

As another example, the array may comprise a grid of 1×12 base plates, each base plate a long rectangle and taking the place of e.g., 8 base plates in the above example. However, an array of square or round base plate segments provides the most versatility in controlling the direction of the segment wave since the wave can propagate in each of the cardinal directions parallel to one side of the array, or a diagonal activation pattern can be employed. Of course the base plate itself need not be square or round, and any polygon may be used, e.g., hexagonal.

One advantage to the linear motors is that they come in varying sizes and force output that that can be tuned to achieve a desired acceleration and sustained velocity of motion. Also the electronic control for the linear motor is well understood because of its wide use in manufacturing applications. The selection of the specific linear motors is an engineering issue at production time because they can be sourced to have a large thrust force but with short strokes as compared to those that have longer strokes with less thrust, but higher speeds. Depending on the expected ground coupling conditions, the array of motors could be easily swapped out and replaced as needed.

In operation, the frame 432 is lowered into proximity to the ground G and the linear motors 435 are operated to lower the replaceable feet 439 into contact with the ground G. Once all of the replaceable feet 439 are in contact with the ground G, the linear motors 435 are activated to sequentially thrust the rods 438 toward the ground G, propagating a wave like pattern across the array, and thereby imparting S-waves (or other waves) into the earth. After activations, the linear motors 435 are quickly operated to recoil the rods 438 without disengaging contact with the ground G by the replaceable feet 439.

As described herein the rods can be operated differentially, sweeping from one side of the frame to another, thus delivering a ripple effect and generating S-waves. By selectively choosing the direction and speed of the ripple effect we can even direct the S-wave in a desired direction. We can also make box waves, shear waves, plane waves or even focused waves down to a point source by directing multiple S-waves towards a chosen focal point.

There are few limitations on the ability to create shaped S-waves of different frequencies and types. The main limits are the speed of actuation of the linear motor and the ability to describe it in terms of the array and the motion of the individual elements in the array.

There is also an aspect of the invention forming waves by using multiple segmented base plate vibes as a fleet shaking a tailored wave. For example, if four segmented base plate vibrator trucks were arranged in a box array and a cross array shear wave was desired, one would start the front and rear right vibes shaking a wave starting on the right outside row of elements in the segmented baseplate. As it progressed across the array till the end of the segmented baseplates, the left two vibes would not be actuating, but at the appropriate time when the wave traversed the distance between the two vibes they could pick up the sweep and continue to build the energy as they shook it constructively. This sort of constructive building of vibe sweeps between different vibes in an array has not been effectively used before now due to the limits of a solid baseplate conventional vibe design.

It should be noted that the undulations and irregularities of the ground G may thus be accommodated avoiding decoupling across the dimension of the frame 432 because each motor is independently controlled and operated. This method may be arranged to automatically compensate for surface topographic variations along with soft and hard spots on the ground surface like rocks or logs. This is also something that cannot be addressed with a conventional baseplate designed vibe. Variations like this result in distortions in a conventionally designed vibrator.

The electric linear motors 435, working in conjunction, do not suffer the limitations of the hydraulic pumping systems at high or low frequencies. Applying and reversing electric power instantly to the linear motors 435 causes movement of the rods 438 within the tubular bodies 436, and the impulse frequency range is thus greatly expanded. By using electrical control circuits that are commonly available for diesel electric train locomotives and hybrid cars, the power can be applied instantly with a very high degree of control and stabilization.

Electrical control circuits also can help recover energy that would normally be lost as heat by using the back-EMF generated during the relaxation phase of the actuation of the linear motor. Just as in hybrid cars and train locomotives, one can instantly switch to regenerative braking mode and use the relaxation phase of the sweep individual elements to recover energy and store it for use in later parts of the sweep.

Linear motors are highly controllable due to the ability to control the force and velocity of the actuator bar 438 via changes in the voltage and amperage of the applied current. As mentioned previously, the back-EMF generated can also be accurately used as a feedback circuit to compensate for variations in the wear patterns and ground impedance variations so that the combined sweep of the whole group of linear motors is consistent and repeatable.

It should be recognized that higher frequencies than typically delivered may be achievable by the source 310. Perhaps frequencies as high as 200 Hz or higher may become useful in the field of seismic prospecting. There is no recognized reason that source 310 cannot deliver such high frequency acoustic energy into the ground G. Since it is generally understood that high frequency energy provides high resolution data, this feature will be very beneficial. Unfortunately, high frequency energy attenuates in the earth more rapidly than low frequency energy. With a large number of linear electric motors, whether 200, more than 200, possibly more than 2000 or less than 200 possibly less than 100, will be able to deliver high energy at high frequency. The size of the linear motors may be reduced or increased to adjust and adapt to ideal energy delivery system to create an optimal frequency range with high energy across the spectrum.

While the invention is described above in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The following references are incorporated by reference in their entirety for all purposes.

US20130286791 Discrete electric seismic source unit
US20120037445: Method for creating an improved sweep for a seismic source
US20130286788 Electrical Energy Accumulator
US20130286789 Active Isolation Apparatus
US20130286779 Quasi-impulsive displacement source
US20130286780 Distinctive Land Seismic Sweep
US20130286790 Simultaneous Composite Land Seismic Sweep

What is claimed is:

1. A method of generating waves for a seismic survey, said method comprising:
    a) providing a vibrator having a segmented baseplate, said segmented baseplate having an array of independently controllable base plate segments; and
    b) differentially activating said base plates segments in a pattern across said array, so as to generate waves reflecting said pattern.

2. The method of claim 1, wherein after a segmented base plate is activated, it switches to a regenerative braking mode and uses the relaxation phase of the activated base plate to recover energy and store it for later use.

3. A method of generating a shear wave (S-wave) for a seismic survey, said method comprising:
    a) providing a vibrator having a segmented baseplate, said segmented baseplate having an array of independently controllable base plate segments; and
    b) activating said base plates segments sequentially in a direction across said array, so as to generate an S-wave propagating in said direction.

4. The method of claim 3, wherein there are a plurality of vibrators generating a plurality of S-waves in a plurality of directions, and wherein said plurality of S-waves intersect at a chosen focal point.

5. The method of claim 3, wherein there are a plurality of vibrators generating a plurality of S-waves in a plurality of directions, and wherein said plurality of S-waves are appropriately delayed so as to constructively form a larger source wave and not intersect at a chosen focal point.

6. The method of claim 3, employing a plurality of vibrators having segmented base plates, such that a plurality of S-waves cross at a chosen focal point.

7. A method of focusing shear waves (S-wave) at a focal point for a seismic survey, said method comprising:
   a) providing a first vibrator having a segmented baseplate, said segmented baseplate having an array of independently controllable base plate segments; and
   b) providing a second vibrator having a segmented baseplate, said segmented baseplate having an array of independently controllable base plate segments; and
   c) activating said base plate segments of said first vibrator sequentially in a first direction across said array, so as to generate a first S-wave propagating in said first direction;
   d) activating said base plate segments of said second vibrator sequentially in a second direction across said array, so as to generate a second S-wave propagating in a second direction;
   e) such that said first S-wave and said second S-wave cross at a chosen focal point.

8. A method of generating compression (P-waves) wave for a seismic survey, said method comprising:
   a) providing a vibrator having a segmented baseplate, said segmented baseplate having an array of independently controllable base plate segments; and
   b) activating said base plates segments sequentially in a direction across said array, so as to generate a P-wave propagating in said direction.

9. The method of claim 8, wherein there are a plurality of vibrators generating a plurality of P-waves in a plurality of directions, and wherein said plurality of P-waves intersect at a chosen focal point.

10. The method of claim 8, wherein there are a plurality of vibrators generating a plurality of P-waves in a plurality of directions, and wherein said plurality of P-waves are appropriately delayed so as to constructively add to form a larger source wave.

11. A method of seismic survey of a geologic region, said method comprising:
   a) providing a vibrator in a geologic region of interest, said vibrator having a segmented baseplate, said segmented baseplate having an array of independently controllable base plate segments; and
   b) activating said base plates segments sequentially in a pattern across said array, so as to generate unconventional waves reflecting said pattern;
   c) detecting reflected or refracted waves in a series of geophones positioned on a surface of said geologic region; and
   d) processing said recording data.

12. The method of claim 11, wherein said pattern is a sequential pattern travelling in a direction across said segmented base plate to generate an S-wave in said direction.

13. The method of claim 12, wherein a plurality of vibrators having segmented base plates generate a plurality of S-waves in a plurality of directions that cross at a chosen focal point.

14. The method of claim 12, wherein a plurality of vibrators having segmented base plates generate a plurality of S-waves at suitable intervals so as to constructively add to form a larger S-wave.

15. The method of claim 11, wherein said pattern is a sequential pattern travelling in a direction across said segmented base plate to generate a P-wave in said direction.

16. The method of claim 11, wherein after a segmented base plate is activated, it switches to a regenerative braking mode and uses the relaxation phase of the activated base plate to recover energy and store it for later use.

* * * * *